United States Patent
Abe

(10) Patent No.: US 8,164,649 B2
(45) Date of Patent: Apr. 24, 2012

(54) WHITE BALANCE ADJUSTING DEVICE, IMAGING APPARATUS, AND RECORDING MEDIUM STORING WHITE BALANCE ADJUSTING PROGRAM

(75) Inventor: Tetsuya Abe, Tokyo (JP)

(73) Assignee: Nikon Corporation, Tokyo (JP)

( * ) Notice: Subject to any disclaimer, the term of this patent is extended or adjusted under 35 U.S.C. 154(b) by 732 days.

(21) Appl. No.: 12/076,181

(22) Filed: Mar. 14, 2008

(65) Prior Publication Data

US 2008/0266417 A1    Oct. 30, 2008

(30) Foreign Application Priority Data

Apr. 25, 2007    (JP) ................................. 2007-115807

(51) Int. Cl.
*H04N 9/73* (2006.01)
(52) U.S. Cl. .................................. 348/223.1
(58) Field of Classification Search ............... 348/223.1, 348/224.1, 225.1; 382/167
See application file for complete search history.

(56) References Cited

U.S. PATENT DOCUMENTS

| | | | | |
|---|---|---|---|---|
| 5,555,022 | A * | 9/1996 | Haruki et al. ............ | 348/223.1 |
| 6,020,920 | A * | 2/2000 | Anderson ................ | 348/222.1 |
| 6,788,331 | B1 * | 9/2004 | Sacca ..................... | 348/14.01 |
| 6,906,744 | B1 | 6/2005 | Hoshuyama et al. | |
| 6,952,225 | B1 * | 10/2005 | Hyodo et al. ........... | 348/223.1 |
| 2002/0101516 | A1 | 8/2002 | Ikeda | |
| 2003/0156206 | A1 * | 8/2003 | Ikeda et al. ............ | 348/223.1 |
| 2004/0212691 | A1 * | 10/2004 | Sato ....................... | 348/223.1 |
| 2006/0045512 | A1 * | 3/2006 | Imamura et al. ........ | 396/225 |
| 2006/0170789 | A1 | 8/2006 | Takahashi et al. | |
| 2006/0232684 | A1 | 10/2006 | Miki | |
| 2007/0047803 | A1 | 3/2007 | Nikkanen | |
| 2007/0154203 | A1 * | 7/2007 | Takahashi et al. ...... | 396/213 |

FOREIGN PATENT DOCUMENTS

| | | |
|---|---|---|
| JP | A-2000-165896 | 6/2000 |
| JP | A-2002-23296 | 1/2002 |
| JP | A-2002-232906 | 8/2002 |
| JP | A-2003-224864 | 8/2003 |
| WO | WO 2007/026303 A1 | 3/2007 |

OTHER PUBLICATIONS

Extended European Search Report issued in EP Application No. 08251258.3 dated Aug. 8, 2011.
Mar. 24, 2011 Office Action issued in Chinese Patent Application No. 200810095706.5 (with translation).

* cited by examiner

*Primary Examiner* — Nhan T Tran
*Assistant Examiner* — Tuan Le
(74) *Attorney, Agent, or Firm* — Oliff & Berridge, PLC

(57) ABSTRACT

A white balance adjusting device includes a dividing unit which divides an image to be processed into plural small areas, a calculating unit which calculates evaluation values of each small area based on color information of the image, a judging unit which judges whether to use the evaluation values of a small area of attention for white balance calculation based on a relationship between the evaluation values of the small area of attention and the evaluation values of small areas adjacent to the small area of attention among the evaluation values of the plural small areas, and a calculating unit which performs white balance calculation based on a judgment result of the judging unit. Therefore, color failure is suppressed and white balance adjustment can be performed properly.

17 Claims, 12 Drawing Sheets

FIG.5

| W | W | W | W | W/B | B | B | B | B | B |
|---|---|---|---|---|---|---|---|---|---|
| W | W | W | W/B | B | B | B | B | B | B/G |
| W | W | W/B | B | B | B | B | B | B/G | G |
| W | W/B | B | B | B | B | B | B/G | G | G |
| W/B | B | B | B | B | B | B/G | G | G | G |
| B | B | B | B | B | B/G | G | G | G | G |
| B | B | B | B | B/G | G | G | G | G | G |
| B | B | B | B/G | G | G | G | G | G | G |
| B | B | B/G | G | G | G | G | G | G | G |

FIG.9

| R/G (-1,-1)<br>B/G (-1,-1) | R/G (-1, 0)<br>B/G (-1, 0) | R/G (-1,+1)<br>B/G (-1,+1) |
|---|---|---|
| R/G (0,-1)<br>B/G (0,-1) | R/G (0, 0)<br>B/G (0, 0) | R/G (0,+1)<br>B/G (0,+1) |
| R/G (+1,-1)<br>B/G (+1,-1) | R/G (+1, 0)<br>B/G (+1, 0) | R/G (+1,+1)<br>B/G (+1,+1) |

WHITE BALANCE ADJUSTING DEVICE, IMAGING APPARATUS, AND RECORDING MEDIUM STORING WHITE BALANCE ADJUSTING PROGRAM

CROSS REFERENCE TO RELATED APPLICATION

This application is based upon and claims the benefit of priority from Japanese Patent Application No. 2007-115807, filed on Apr. 25, 2007, the entire contents of which is incorporated herein by reference.

BACKGROUND

1. Field

The embodiments relate to a white balance adjusting device which performs white balance adjustment on image data to be processed, and a related imaging apparatus and white balance adjusting program.

2. Description of the Related Art

Techniques for performing white balance adjustment on digital image data are known. And a technique has been proposed which varies the weights of pieces of information used for white balance adjustment according to luminance information to prevent color failure due to an object color in the white balance adjustment (refer to Japanese Unexamined Patent Application Publication No. 2002-232906, for example).

Incidentally, there may occur an event that color contamination occurs in object color boundary portions included in image data and white balance adjustment is performed improperly due to color failure. The technique of the above publication No. 2002-23296 cannot accommodate this problem.

SUMMARY

A proposition of the embodiments is therefore to provide a white balance adjusting device, an imaging apparatus, and a white balance adjusting program which can suppress color failure and perform white balance adjustment properly.

To attain the above proposition, a color balance adjusting device according to the present embodiment includes a dividing unit which divides an image to be processed into plural small areas; a calculating unit which calculates evaluation values of each of the small areas based on color information of the image; a judging unit which makes a judgment as to whether to use the evaluation values of a small area of attention for white balance calculation based on a relationship between the evaluation values of the small area of attention and the evaluation values of small areas adjacent to the small area of attention among the evaluation values of the plural small areas; and a calculating unit which performs white balance calculation based on a judgment result of the judging unit.

For example, the judging unit makes the judgment based on whether the evaluation values are included in achromatic regions which are defined in advance in a predetermined chromatic coordinate.

For example, the judging unit judges that the evaluation values of the small area of attention should be used for white balance calculation if the evaluation values of the small area of attention are included in the achromatic regions and evaluation values of all of the small areas adjacent to the small area of attention are included in the achromatic regions.

For example, the judging unit judges that the evaluation values of the small area of attention should be used for white balance calculation if the evaluation values of the small area of attention are included in the achromatic regions and color differences between the small area of attention and all of the small areas adjacent to the small area of attention are smaller than or equal to a predetermined value.

Furthermore, for example, the calculating unit determines a weight to be applied to the evaluation values of the small area of attention according to the color differences when they are used for white balance calculation.

An imaging apparatus having any of the above white balance adjusting devices is effective as a specific form of implementation of the present embodiment.

A white balance adjusting program, as obtained by converting the expression of any of the above white adjusting devices into a program form, for realizing white balance adjustment on image data to be processed is also effective as a specific form of implementation of the present embodiment.

BRIEF DESCRIPTION OF THE DRAWINGS

FIG. 5 illustrates colors of respective small areas;

FIG. 9 illustrates how color differences $\Delta C$ are calculated;

DETAILED DESCRIPTION OF THE EMBODIMENTS

First Embodiment

A first embodiment will be described below with reference to the drawings. The first embodiment is directed to an electronic camera which is equipped with a white balance adjusting device according to the present embodiment.

Figure 1:
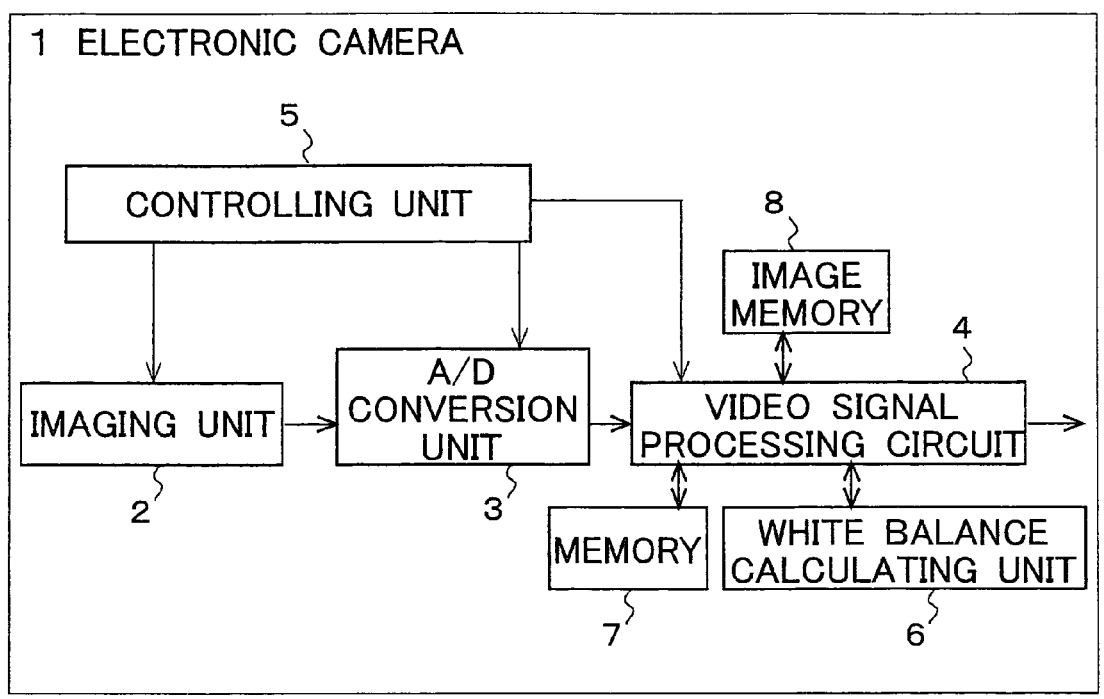
FIG. 1 is a functional block diagram of an electronic camera 1 according to a first embodiment.

FIG. 1 is a functional block diagram of an electronic camera 1 according to the first embodiment. As illustrated in FIG. 1, the electronic camera 1 is equipped with an imaging unit 2, an A/D conversion unit 3, a video signal processing circuit 4, and a controlling unit 5 for controlling the individual units. Equipped with an imaging lens (not illustrated), an imaging device, etc., the imaging unit 2 generates an image signal by taking an image of an object and outputs it to the A/D conversion unit 3. The A/D conversion unit 3 generates digital image data based on the received image signal and outputs it to the video signal processing circuit 4. The electronic camera 1 is also equipped with a white balance calculating unit (hereinafter referred to as "WB calculating unit") 6, a memory 7, and an image memory 8. The image data that is input to the video signal processing circuit 4 is subjected to various kinds of image processing by the video signal processing circuit 4 and the WB calculating unit 6. The other part of the configuration of the electronic camera 1 will not be described or illustrated because it is the same as in the related art.

Figure 2:
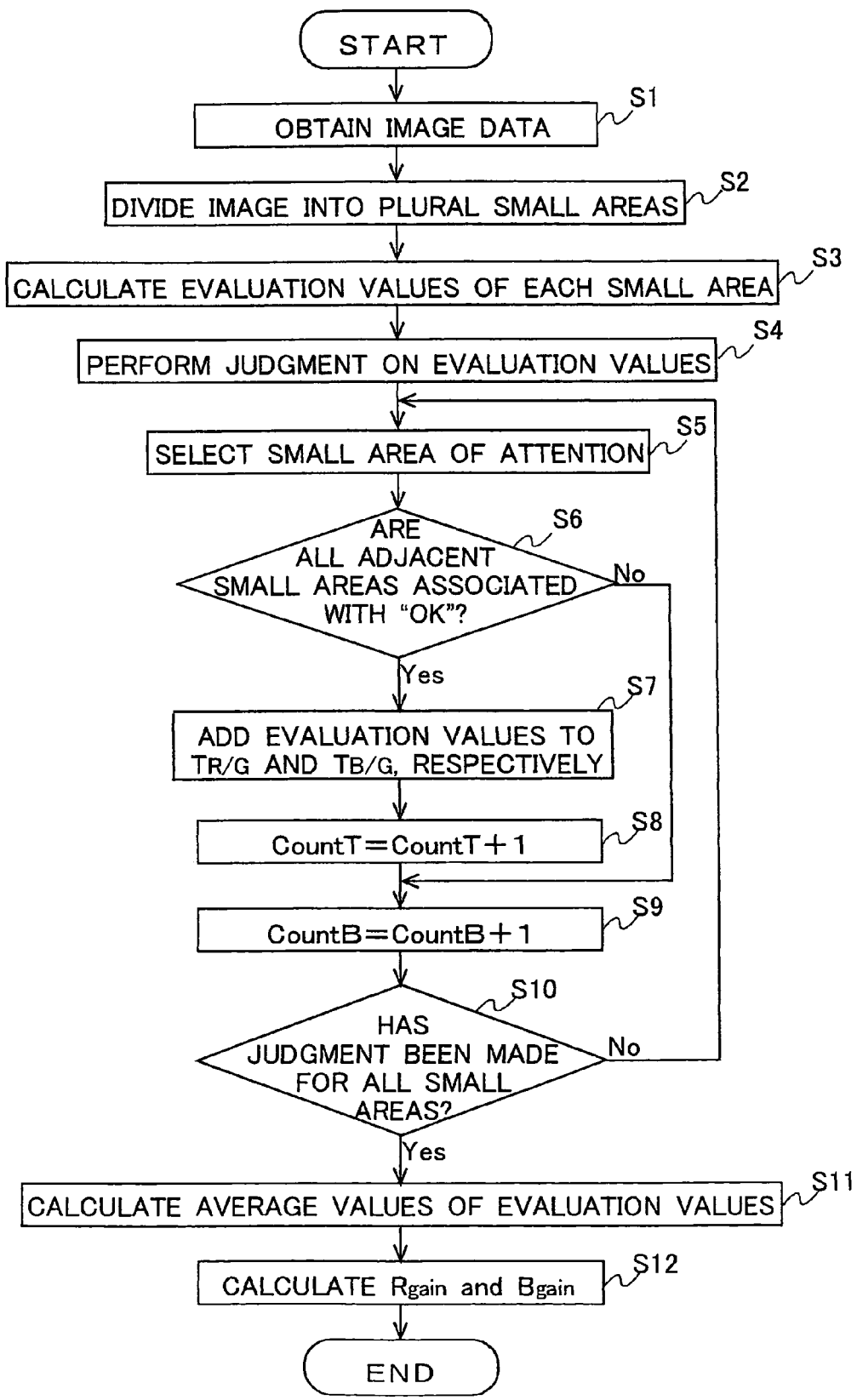
FIG. 2 is a flowchart of a process which is executed by the electronic camera 1 according to the first embodiment.

FIG. 2 is a flowchart of a process which is executed by the WB calculating unit 6 at the time of white balance adjustment.

At step S1, the WB calculating unit 6 obtains image data of an image to be processed from the video signal processing circuit 4. The image data is RGB image data.

Figure 3:
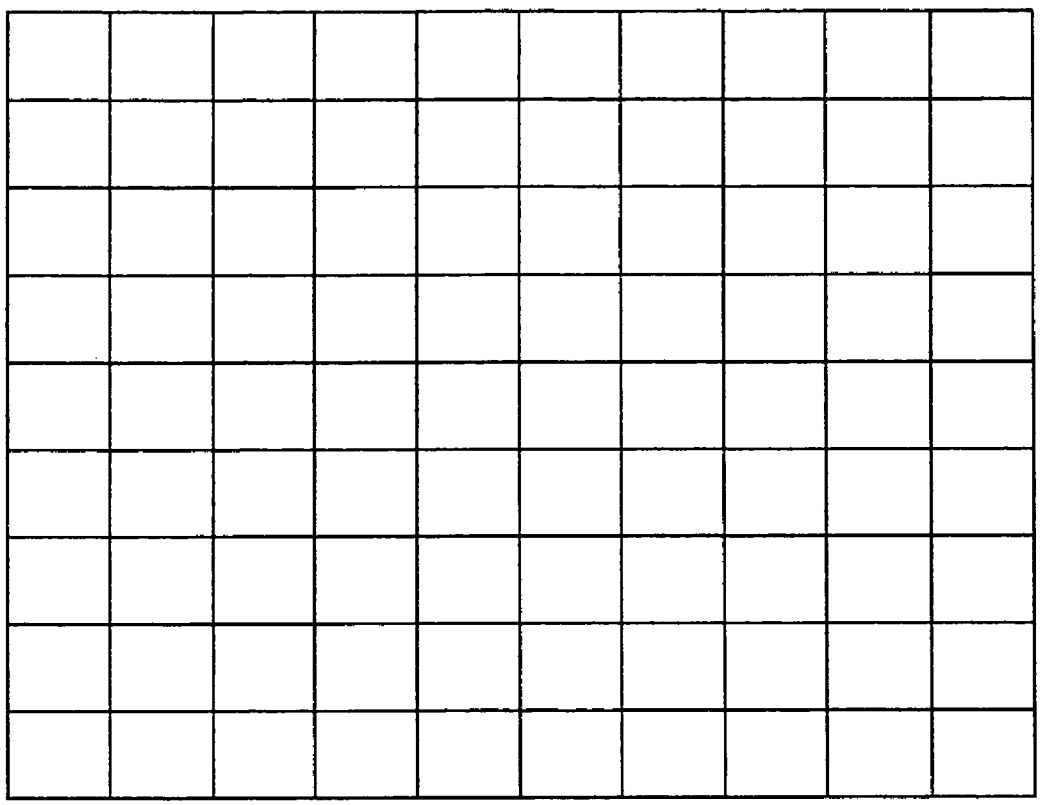
FIG. 3 illustrates how an image is divided.

At step S2, the WB calculating unit 6 divides the obtained image into plural small areas. In this embodiment, as illustrated in FIG. 3, the image data is divided into 9 (vertical)×10 (horizontal) small areas.

At step S3, the WB calculating unit 6 calculates evaluation values for each of the small areas produced at step S2. The evaluation values are two values, that is, (average of R values)/(average of G values) and (average of B values)/(average of G values) which will be referred to as R/G and B/G, respectively. The WB calculating unit 6 stores the calculated evaluation values R/G's and B/G's of the respective small areas in the memory 7 (the evaluation values are stored temporarily), and moves to step S4.

Figure 4:
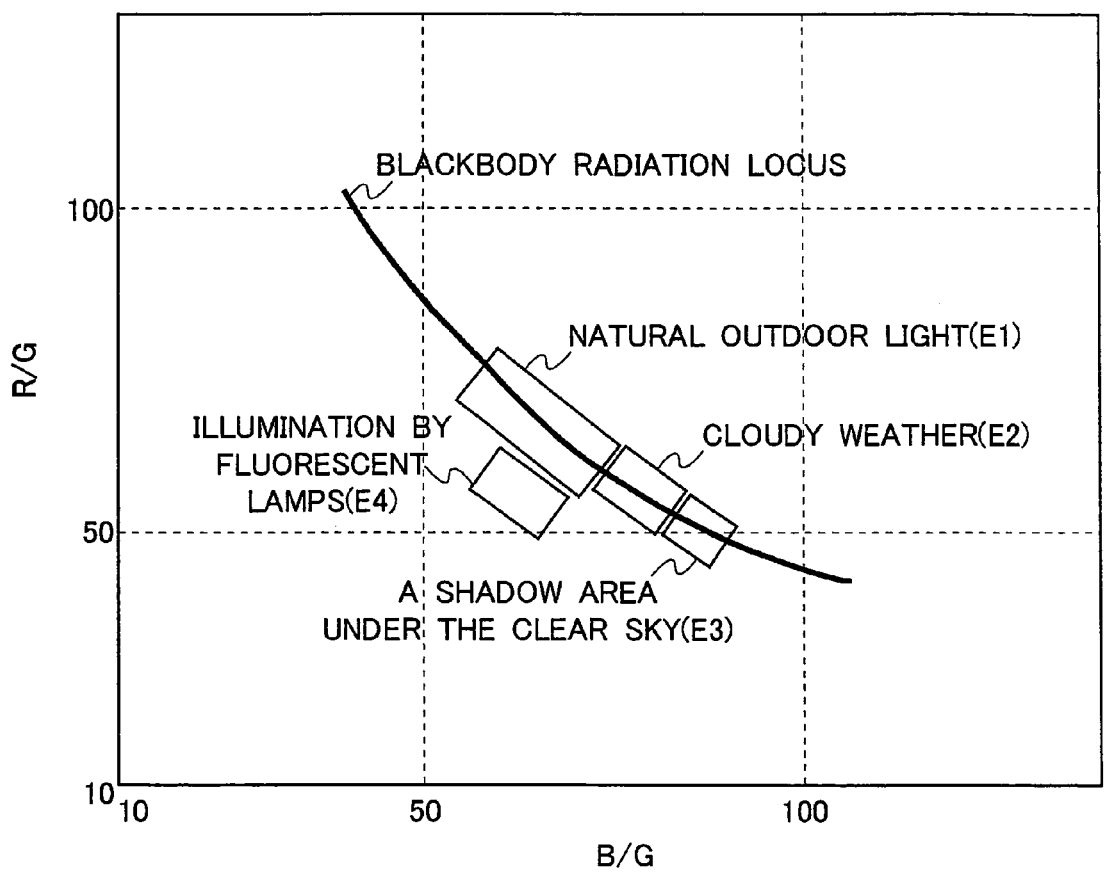
FIG. 4 illustrates how judgment is performed.

At step S4, the WB calculating unit 6 performs judgment on the evaluation values of each small area calculated at step S3. More specifically, the WB calculating unit 6 performs judgment on the evaluation values of each small area based on whether or not the evaluation values calculated at step S3 are included in predetermined achromatic regions in a predetermined color plane illustrated in FIG. 4. In FIG. 4, the horizontal axis and the vertical axis represent B/G and R/G, respectively. In FIG. 4, four achromatic regions E1-E4 are defined in advance according to a blackbody radiation locus. The achromatic regions E1-E4 are defined for natural outdoor light, cloudy weather, a shadow area under the clear sky, and illumination by fluorescent lamps, respectively. The WB calculating unit 6 judges whether or not the evaluation values of each small area is included in one of the achromatic regions E1-E4. If the evaluation values are included in one of the achromatic regions E1-E4, the WB calculating unit 6 stores "OK" in the memory 7 in such a manner that it is correlated with the small area concerned. If the evaluation values are not included in any of the achromatic regions E1-E4, the WB calculating unit 6 stores "NG" in the memory 7 in such a manner that it is correlated with the small area concerned.

Figure 6:
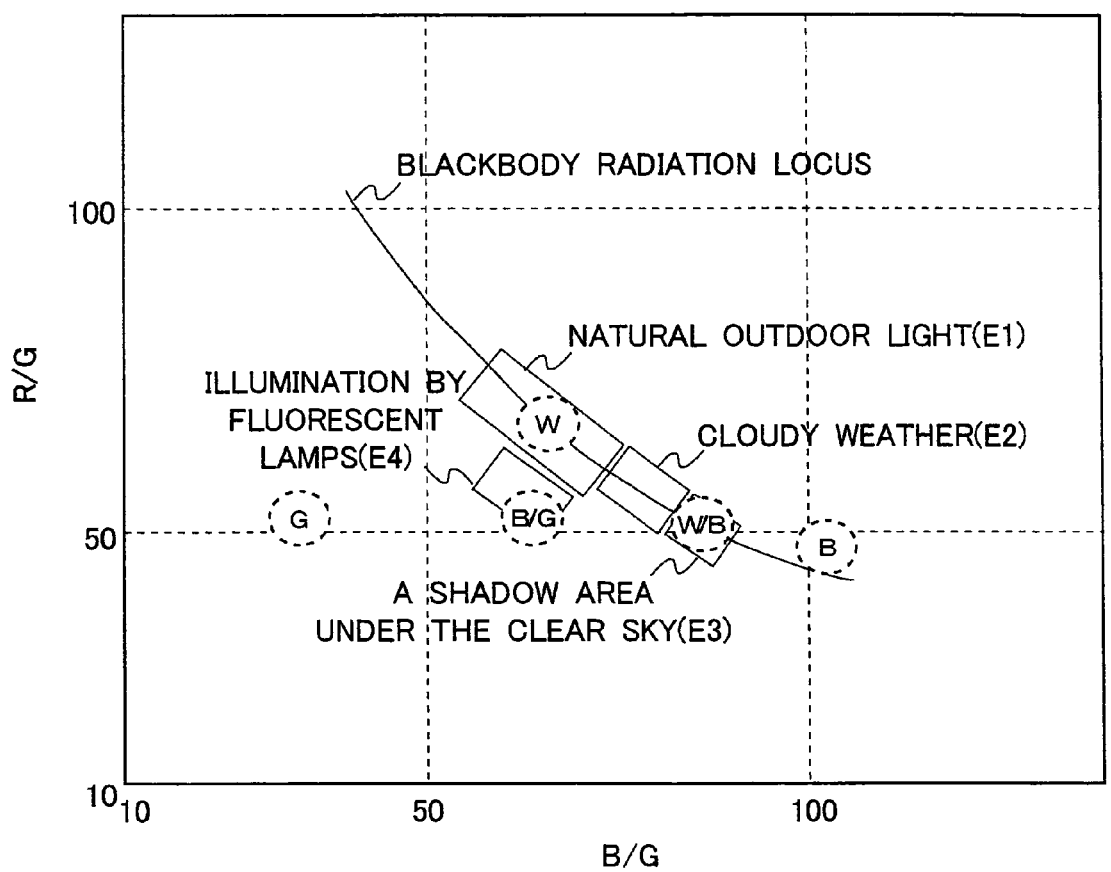
FIG. 6 illustrates how judgment is performed on the image of FIG. 5.

For example, in the case of an image in which a top-left area is white, a bottom-right area is green, and a blue area exists between them (see FIG. 5), the evaluation values of small areas indicated by W in FIG. 5 are included in the achromatic region E1 which is defined for outdoor natural light (see FIG. 6). The evaluation values of small areas indicated by "B" in FIG. 5 and those of small areas indicated by "G" in FIG. 5 are not included in any of the achromatic regions E1-E4. Small areas indicated by "W/B" in FIG. 5 are ones located at the boundary between the white area and the blue area, and their evaluation values are included in the achromatic region E3 which is defined for a shadow area under the clear sky. Small areas indicated by "B/G" in FIG. 5 are ones located at the boundary between the blue area and the green area, and their evaluation values are included in the achromatic region E4 which is defined for illumination by fluorescent lamps.

Therefore, the WB calculating unit 6 stores "OK" in the memory 7 for the small areas indicated by "W", "W/B", or "B/G" in FIG. 5 and stores "NG" in the memory 7 for the small areas indicated by "B" or "G".

At step S5, the WB calculating unit 6 selects a small area of attention. The WB calculating unit 6 selects small areas of attention in order starting from the small area that is located at the top-left corner.

At step S6, the WB calculating unit 6 judges whether or not all the small areas (i.e., eight small areas) adjacent to the small area selected at step S5 are associated with "OK". If judging that all of such small areas are associated with "OK", the WB calculating unit 6 moves to step S7. On the other hand, if there is at least one small area that is associated with "NG", the WB calculating unit 6 moves to step S9 (described later).

Among the small areas for which "OK" was stored at step S4 (judgment), it is not appropriate to use, for white balance calculation, the evaluation values of the small areas indicated by "W/B" because color contamination will occur there. The small areas indicated by "B/G" were erroneously detected by the judgment at step S4 because actually they are not achromatic areas. However, these small areas can be excluded from subjects of white balance calculation by virtue of the judgment of step S6.

At step S7, the WB calculating unit 6 adds the evaluation values of the small area selected at step S5 to $T_{R/G}$ and $T_{B/G}$, respectively. Symbols $T_{R/G}$ and $T_{B/G}$ represent the sums of evaluation values and are initialized ($T_{R/G}=0$, $T_{B/G}=0$) before the process is started.

At step S8, the WB calculating unit 6 increments, by one, parameter CountT in the memory 7. Then, the WB calculating unit 6 moves to step S9. Parameter CountT is the count of a counter for counting the number of evaluation values that have been added to $T_{R/G}$ and $T_{B/G}$ at step S7, and is initialized (CountT=0) before the process is started.

At step S9, the WB calculating unit 6 increments, by one, parameter CountB in the memory 7. Then, the WB calculating unit 6 moves to step S10. Parameter CountB is the count of a counter for counting the number of small areas that have been selected at step S5, and is initialized (CountB=0) before the process is started.

If it is judged at step S6 that there is at least one small area that is associated with "NG" (step S6: no), steps S7 and S8 are skipped. That is, the evaluation values of the small area of attention are excluded from subjects of white balance calculation.

At step S10, the WB calculating unit 6 judges, based on the count CountB stored in the memory 7, whether or not the judgment of step S6 has been made for all the small areas. If judging that the judgment of step S6 has been made for all the small areas, the WB calculating unit 6 moves to step S11. On the other hand, if judging that the judgment of step S6 has not been made for all the small areas yet, the WB calculating unit 6 returns to step S5 and selects the next small area as a small area of attention.

At step S11, the WB calculating unit 6 calculates average values of the evaluation values according to the following Equations (1) and (2):

$$\text{(Average value of evaluation values } R/G) = T_{R/G}/\text{Count}T \tag{1}$$

$$\text{(Average value of evaluation values } B/G) = T_{B/G}/\text{Count}T \tag{2}$$

At step S12, the WB calculating unit 6 calculates $R_{gain}$ and $B_{gain}$ based on the average values of evaluation values calculated at step S11. A specific method for calculating $R_{gain}$ and $B_{gain}$ is the same as in the well-known technique.

As described above, in the first embodiment, a dividing unit which divides an image to be processed into plural small areas, a calculating unit which calculates evaluation values of each small area based on color information of the image, and a judging unit which judges whether to use the evaluation values of a small area of attention for white balance calculation based on a relationship between the evaluation values of the small area of attention and the evaluation values of small areas adjacent to the small area of attention among the evaluation values of the plural small areas are provided and white balance calculation is performed based on a judgment result of the judging unit. Therefore, color failure is suppressed and white balance adjustment can be performed properly.

Furthermore, in the first embodiment, the judging unit makes the judgment based on whether or not the evaluation values are included in achromatic regions which are defined in advance in a predetermined chromatic coordinate. Therefore, small areas that may cause color contamination can be excluded from subjects of white balance calculation.

Still further, in the first embodiment, the judging unit judges that the evaluation values of the small area of attention should be used for white balance calculation if the evaluation values of the small area of attention are included in the achromatic regions and the evaluation values of all of the small areas adjacent to the small area of attention are included in the achromatic regions. Therefore, achromatic areas can be selected with high accuracy and used for white balance calculation.

Second Embodiment

A second embodiment will be described below with reference to the drawings. The second embodiment is a modification of the first embodiment. In the second embodiment, only components, operations, etc. that are different than in the first embodiment will be described in detail with components having the same components in the first embodiment given the same reference symbols as the latter.

The second embodiment is directed to an electronic camera which is the same in configuration as the electronic camera 1 of FIG. 1 according to the first embodiment.

Figure 7:
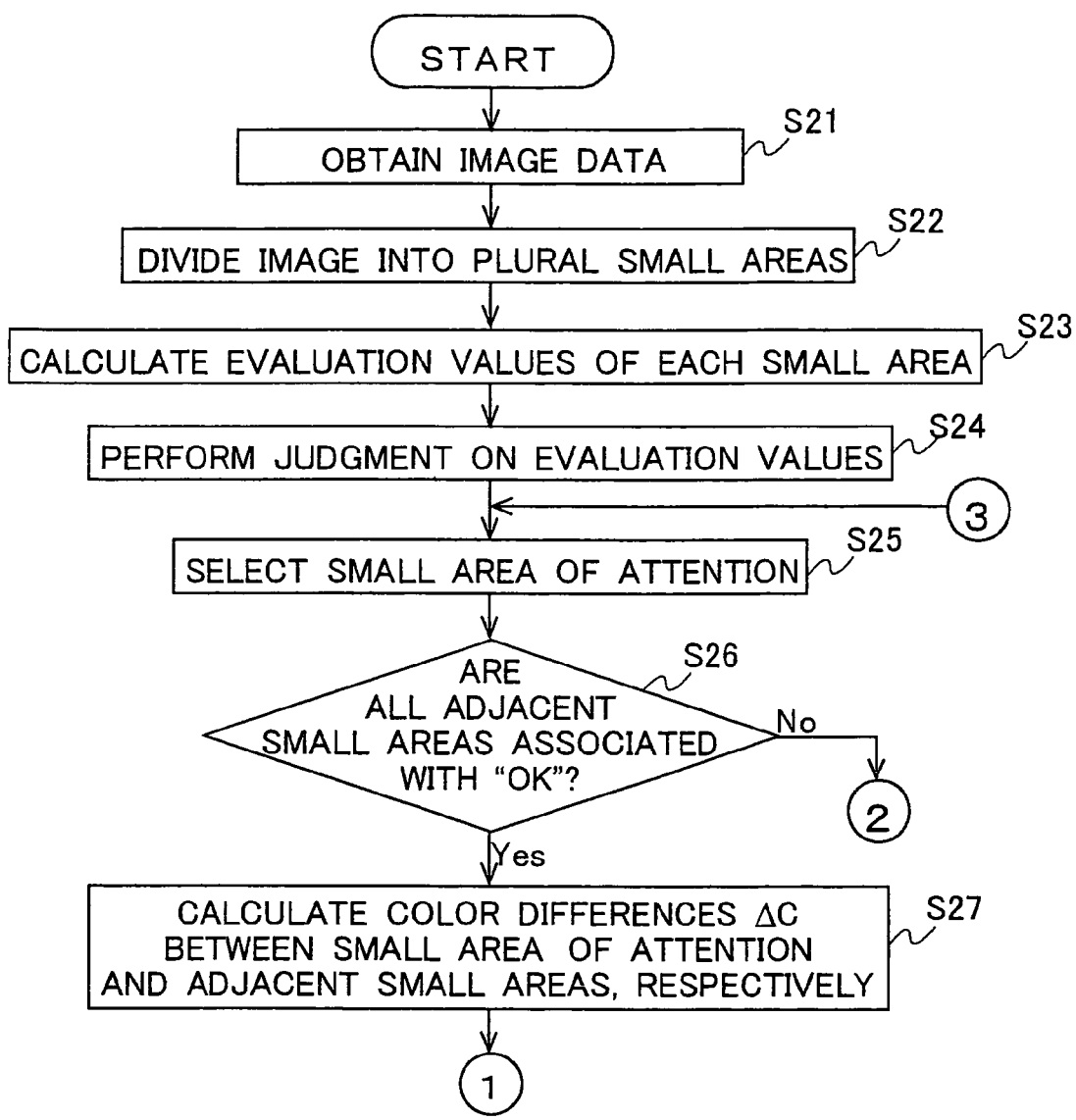
FIG. 7 is a flowchart of a process which is executed by an electronic camera 1 according to a second embodiment.
Figure 8:
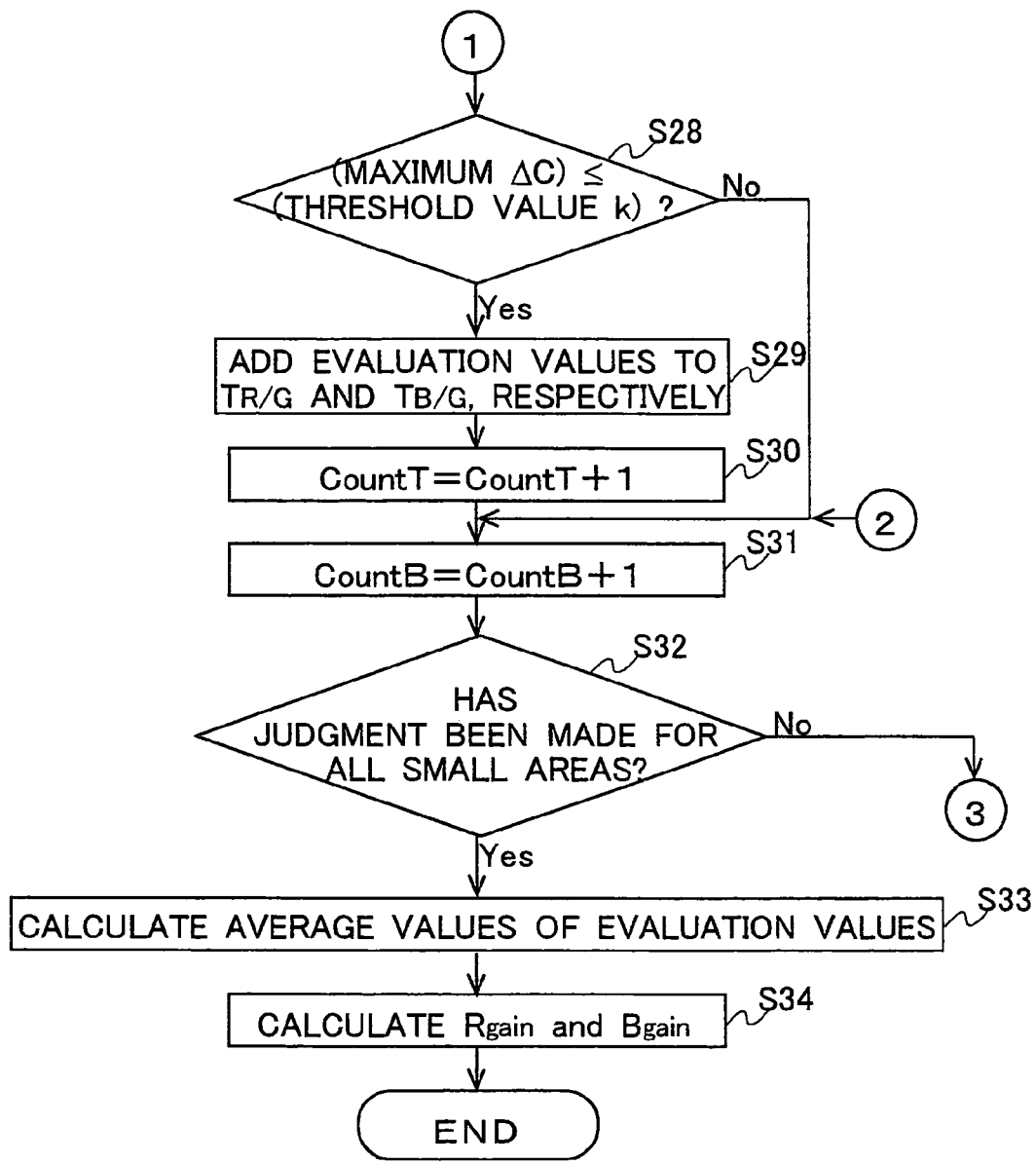
FIG. 8 is (a continuation of) a flowchart of a process which is executed by an electronic camera 1 according to a second embodiment.

FIGS. 7 and 8 are a flowchart of a process which is executed by the WB calculating unit 6 at the time of white balance adjustment.

At steps S21-S25, the WB calculating unit 6 performs the same processing as at steps S1-S5 in FIG. 2.

At step S26, as at step S6 in FIG. 2, the WB calculating unit 6 judges whether or not all the small areas (i.e., eight small areas) adjacent to the small area selected at step S25 are associated with "OK". If judging that all of such small areas are associated with "OK", the WB calculating unit 6 moves to step S27. On the other hand, if there is at least one small area that is associated with "NG", the WB calculating unit 6 moves to step S31 (described later).

At step S27, the WB calculating unit 6 calculates color differences ΔC between the small area selected at step S25 and all the small areas adjacent to it, respectively.

FIG. 9 illustrates how to calculate color differences ΔC. Assume that the central small area (0, 0) is the small area selected at step S25; then, a color difference $\Delta C_{(x, y)}$ between the small area selected at step S25 and an adjacent small area (x, y) is calculated according to the following Equation (3):

$$\Delta C_{(x,y)} = \sqrt{(R/G_{(x,y)} - R/G_{(0,0)})^2 + (B/G_{(x,y)} - B/G_{(0,0)})^2} \quad (3)$$

In Equation (3), (x, y) is one of eight combinations, that is, (−1, −1), (−1, 0), (−1, +1), (0, −1), (0, +1), (+1, −1), (+1, 0), and (+1, +1). The WB calculating unit 6 calculates color differences ΔC for these eight combinations of (x, y), stores them in the memory 7 (the calculated color differences ΔC are stored temporarily), and moves to step S28. A calculated color difference $\Delta C_{(x,y)}$ stored in the memory 7 may be reused for the same combination of (x, y) corresponding to a different small area of attention (i.e., a color difference $\Delta C_{(x, y)}$ is calculated only when each combination (x, y) appears for the first time).

At step S28, the WB calculating unit 6 judges whether or not the maximum value of the color differences $\Delta C_{(x, y)}$ calculated at step S27 is smaller than or equal to a predetermined threshold value k. If judging that it is smaller than or equal to the predetermined threshold value k, the WB calculating unit 6 moves to step S29. On the other hand, if judging that it is larger than the predetermined threshold value k, the WB calculating unit 6 moves to step S31 (described later).

At step S29, as at step S7 in FIG. 2, the WB calculating unit 6 adds the evaluation values of the small area selected at step S25 to $T_{R/G}$ and $T_{B/G}$, respectively. Symbols $T_{R/G}$ and $T_{B/G}$ represent the sums of evaluation values and are initialized ($T_{R/G}=0$, $T_{B/G}=0$) before the process is started.

At step S30, as at step S8 in FIG. 2, the WB calculating unit 6 increments, by one, parameter CountT in the memory 7. Then, the WB calculating unit 6 moves to step S31. Parameter CountT is the count of a counter for counting the number of evaluation values that have been added to $T_{R/G}$ and $T_{B/G}$ at step S29, and is initialized (CountT=0) before the process is started.

At step S31, as at step S9 in FIG. 2, the WB calculating unit 6 increments, by one, parameter CountB in the memory 7. Then, the WB calculating unit 6 moves to step S32. Parameter CountB is the count of a counter for counting the number of small areas that have been selected at step S26, and is initialized (CountB=0) before the process is started.

Steps S29 and S30 are skipped if it is judged at step S26 that there is at least one small area that is associated with "NG" (step S6: no) or if it is judged at step S28 that the maximum value of the color differences $\Delta C_{(x, y)}$ are larger than the predetermined threshold value k (step S28: no). That is, the evaluation values of the small area of attention are excluded from subjects of white balance calculation.

At step S32, as at step S10 in FIG. 2, the WB calculating unit 6 judges, based on the count CountB in the memory 7, whether or not the judgment of step S26 has been made for all the small areas. If judging that the judgment of step S26 has been made for all the small areas, the WB calculating unit 6 moves to step S33. On the other hand, if judging that the judgment of step S26 has not been made for all the small areas yet, the WB calculating unit 6 returns to step S25 and selects the next small area as a small area of attention.

At step S33, as at step S11 in FIG. 2, the WB calculating unit 6 calculates average values of the evaluation values.

At step S34, as at step S12 in FIG. 2, the WB calculating unit 6 calculates $R_{gain}$ and $B_{gain}$ based on the average values of evaluation values calculated at step S33.

As described above, in the second embodiment, the judging unit judges that the evaluation values of the small area of attention should be used for white balance calculation if the evaluation values of the small area of attention are included in the achromatic regions and the color differences between the small area of attention and all of the small areas adjacent to the small area of attention are smaller than or equal to the predetermined value. Therefore, the second embodiment provides, in addition to the advantages of the first embodiment, an advantage that small areas that may cause color contamination can be excluded more reliably from subjects of white balance calculation and hence the evaluation values of small areas with low degrees of color unevenness can be used for white balance calculation.

Third Embodiment

A third embodiment will be described below with reference to the drawings. The third embodiment is a modification of the first and second embodiments. In the third embodiment, only components, operations, etc. that are different than in the first and second embodiments will be described in detail with components having the same components in the first and second embodiments given the same reference symbols as the latter.

The third embodiment is directed to an electronic camera which is the same in configuration as the electronic camera 1 of FIG. 1 according to the first embodiment.

Figure 10:
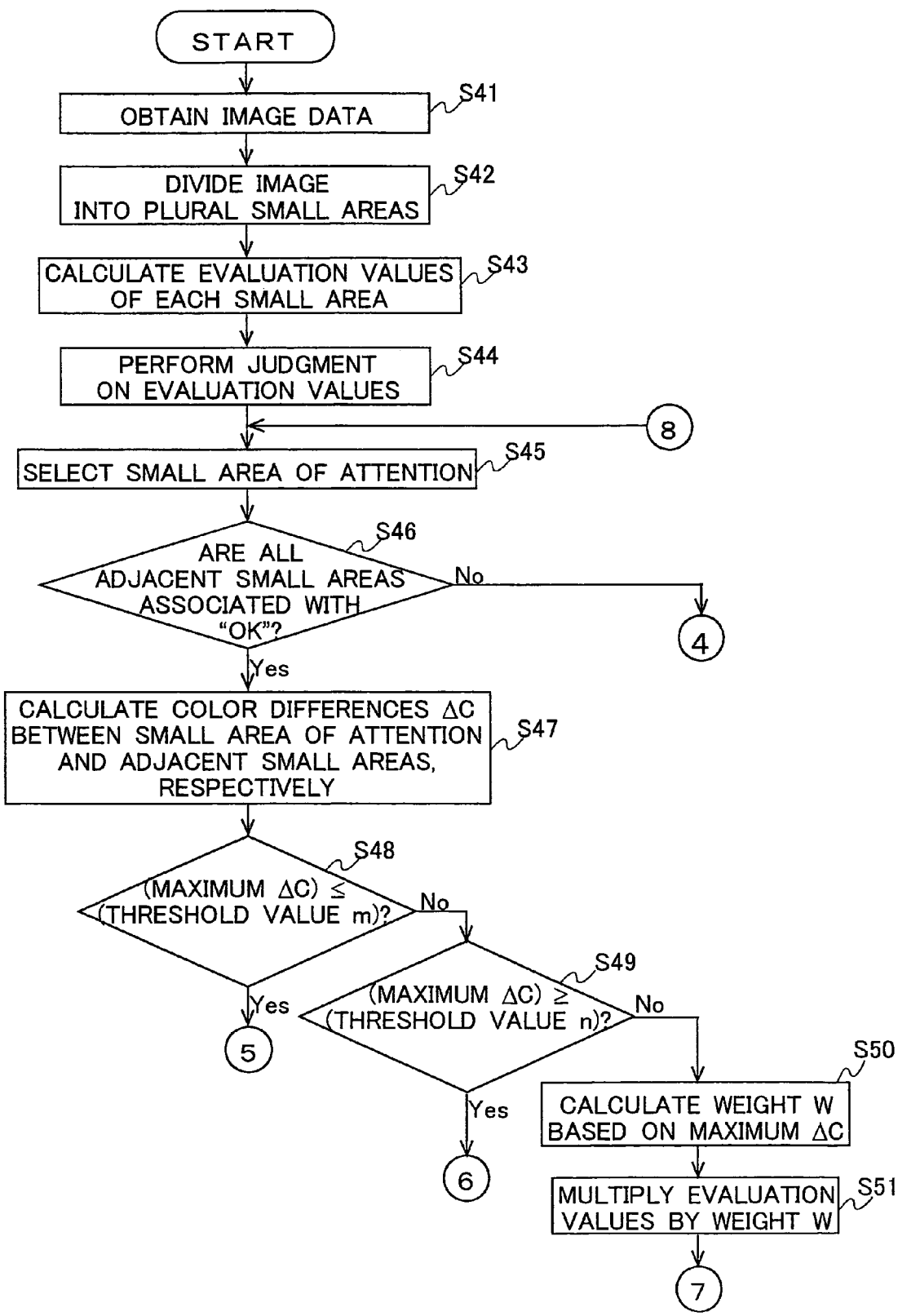
FIG. 10 is a flowchart of a process which is executed by an electronic camera 1 according to a third embodiment.
Figure 11:
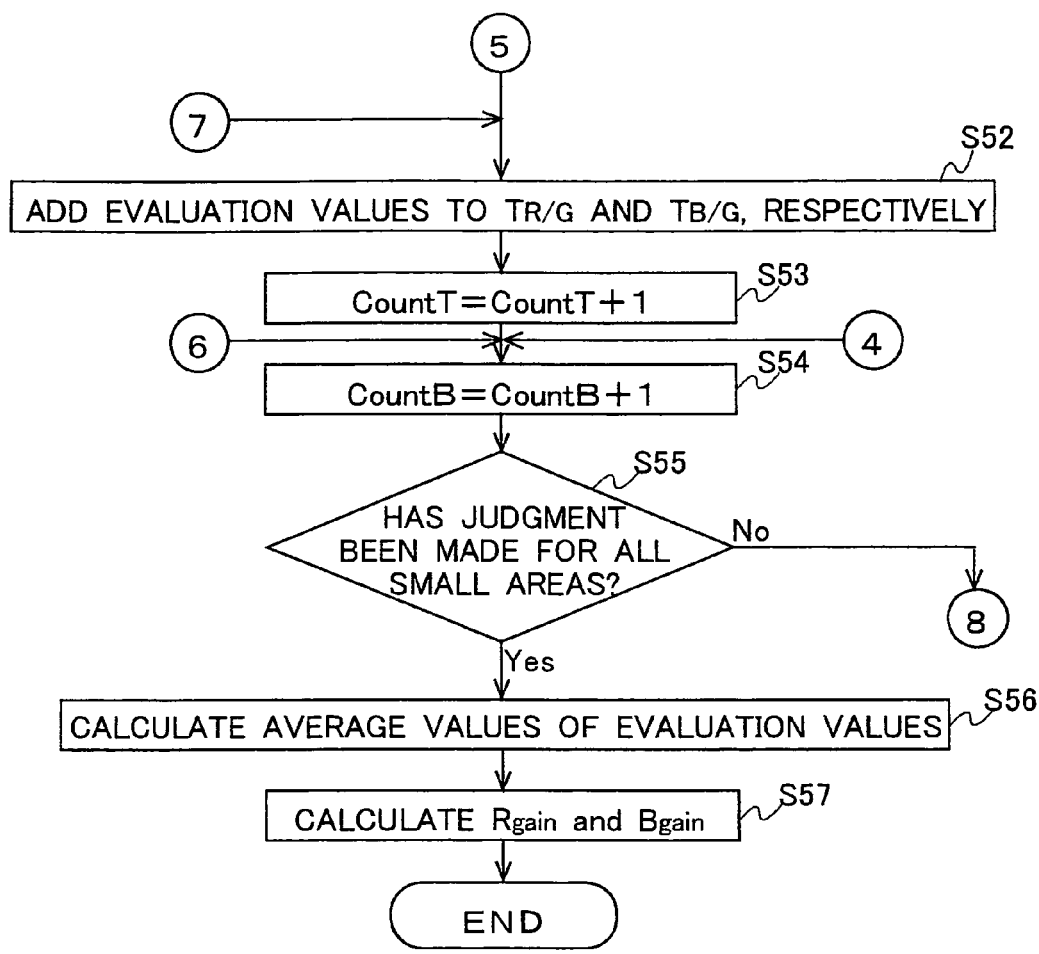
FIG. 11 is (a continuation of) a flowchart of a process which is executed by an electronic camera 1 according to a third embodiment.

FIGS. 10 and 11 are a flowchart of a process which is executed by the WB calculating 110 unit 6 at the time of white balance adjustment.

At steps S41-S45, the WB calculating unit 6 performs the same processing as at steps S1-S5 in FIG. 2.

At step S46, as at step S6 in FIG. 2, the WB calculating unit 6 judges whether or not all the small areas (i.e., eight small areas) adjacent to the small area selected at step S45 are associated with "OK". If judging that all of such small areas are associated with "OK", the WB calculating unit 6 moves to step S47. On the other hand, if there is at least one small area that is associated with "NG", the WB calculating unit 6 moves to step S54 (described later).

At step S47, the WB calculating unit 6 calculates color differences $\Delta C_{(x, y)}$ for the eight combinations of (x, y) in the same manner as at step S27 in FIG. 7.

At step S48, the WB calculating unit 6 judges whether or not the maximum value of the color differences $\Delta C_{(x, y)}$ calculated at step S47 is smaller than or equal to a predetermined threshold value m. If judging that it is smaller than or equal to the predetermined threshold value m, the WB calculating unit 6 moves to step S52 (described later). On the other hand, if judging that it is larger than the predetermined threshold value m, the WB calculating unit 6 moves to step S49.

At step S49, the WB calculating unit 6 judges whether or not the maximum value of the color differences $\Delta C_{(x, y)}$ calculated at step S47 is larger than or equal to a predetermined threshold value n. If judging that it is larger than or equal to the predetermined threshold value n, the WB calculating unit 6 moves to step S54 (described later). On the other hand, if judging that it is smaller than the predetermined threshold value n, the WB calculating unit 6 moves to step S50.

If the maximum value of the color differences $\Delta C_{(x, y)}$ is larger than the threshold value m and smaller than the threshold value n, at step S50, the WB calculating unit 6 calculates a weight W according to the following Equation (4) based on the maximum value of the color differences $\Delta C_{(x, y)}$:

$$W=1-\{(a-m)/(n-m)\} \qquad (4)$$

where a is the maximum value of the color differences $\Delta C_{(x, y)}$.

At step S51, the WB calculating unit 6 multiplies the evaluation values of the small area selected at step S45 by the weight W calculated at step S50. Then, the WB calculating unit 6 moves to step S52.

At step S52, as at step S7 in FIG. 2, the WB calculating unit 6 adds the evaluation values to $T_{R/G}$ and $T_{B/G}$, respectively. Symbols $T_{R/G}$ and $T_{B/G}$ represent the sums of evaluation values and are initialized ($T_{R/G}=0$, $T_{B/G}=0$) before the process is started. If the maximum value of the color differences $\Delta C_{(x, y)}$ is larger than the threshold value m and smaller than the threshold value n, at step S52, the evaluation values as multiplied by the weight W at step S51 are added to $T_{R/G}$ and $T_{B/G}$.

At step S53, as at step S8 in FIG. 2, the WB calculating unit 6 increments, by one, parameter CountT in the memory 7. Then, the WB calculating unit 6 moves to step S54. Parameter CountT is the count of a counter for counting the number of evaluation values that have been added to $T_{R/G}$ and $T_{B/G}$ at step S52, and is initialized (CountT=0) before the process is started.

At step S54, as at step S9 in FIG. 2, the WB calculating unit 6 increments, by one, parameter CountB in the memory 7. Then, the WB calculating unit 6 moves to step S54. Parameter CountB is the count of a counter for counting the number of small areas that have been selected at step S45, and is initialized (CountB=0) before the process is started.

Steps S52 and S53 are skipped if it is judged at step S49 that the maximum value of color differences $\Delta C_{(x, y)}$ are larger than or equal to the threshold value n (step S49: yes). That is, the weight W for a small area whose maximum value of color differences $\Delta C_{(x, y)}$ are larger than or equal to the threshold value n is set to 0.

Figure 12:
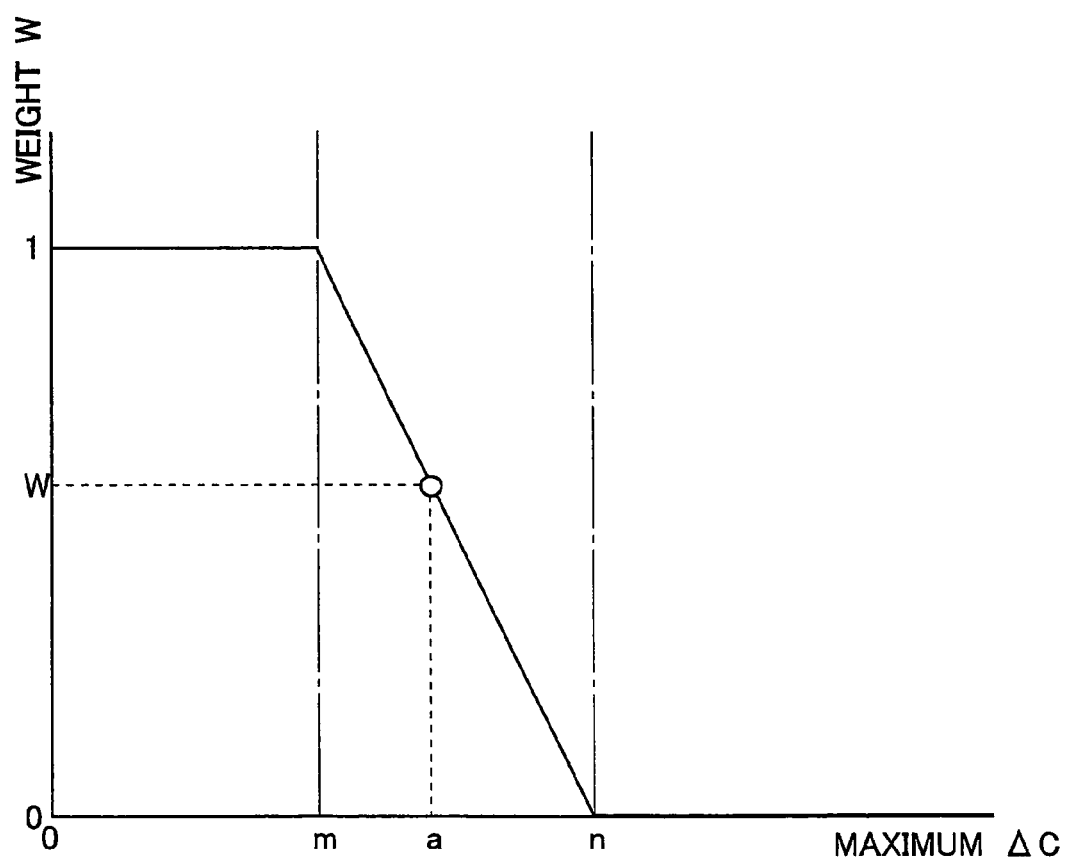
FIG. 12 illustrates a relationship between the maximum value of color differences $\Delta C_{(x, y)}$ and the weight W.

FIG. 12 illustrates a relationship between the maximum value of color differences $\Delta C_{(x, y)}$ and the weight W. As illustrated in FIG. 12, the weight W is set to 1 if the maximum value of color differences $\Delta C_{(x, y)}$ is smaller than or equal to the threshold value m (step S48: yes). The weight W is set to 0 if the maximum value of color differences $\Delta C_{(x, y)}$ is larger than or equal to the threshold value n (step S49: yes). If the maximum value of color differences $\Delta C_{(x, y)}$ is larger than the threshold value m and smaller than the threshold value n (step S49: no), the weight W is determined according to the maximum value of color differences $\Delta C_{(x, y)}$.

That is, if the maximum value of color differences $\Delta C_{(x, y)}$ is sufficiently small, the weight W is determined so that the evaluation values of the small area of attention contributes to white balance calculation greatly. On the other hand, if the maximum value of color differences $\Delta C_{(x, y)}$ is sufficiently large, the evaluation values of the small area of attention are excluded from subjects of white balance calculation.

At step S55, as at step S10 in FIG. 2, the WB calculating unit 6 judges, based on the count CountB in the memory 7, whether or not the judgment of step S46 has been made for all the small areas. If judging that the judgment of step S46 has been made for all the small areas, the WB calculating unit 6 moves to step S56. On the other hand, if judging that the judgment of step S46 has not been made for all the small areas yet, the WB calculating unit 6 returns to step S45 and selects the next small area as a small area of attention.

At step S56, as at step S11 in FIG. 2, the WB calculating unit 6 calculates average values of the evaluation values.

At step S57, as at step S12 in FIG. 2, the WB calculating unit 6 calculates $R_{gain}$ and $B_{gain}$ based on the average values of evaluation values calculated at step S56.

As described above, in the third embodiment, a weight to be applied to the evaluation values when they are used for white balance calculation is determined according to the color differences. Therefore, the third embodiment provides, in addition to the advantages of the first embodiment, an advantage that the degree of contribution of the evaluation values of each small area of attention to white balance calculation can be adjusted according to color differences.

Although in each of the above-described embodiments image data of an image to be processed is RGB image data, the present embodiment can similarly be applied to a case that image data of an image to be processed is image data in another color space (e.g., YCbCr image data).

Although each of the above-described embodiments is directed to the electronic camera which is equipped with the white balance adjusting device, the present embodiment can similarly be applied to an image processing apparatus using a computer. In this case, it is appropriate to store, in the computer, a program corresponding to the flowchart of FIG. 2, FIGS. 7 and 8, or FIGS. 10 and 11.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A white balance adjusting device comprising:
   a dividing unit which divides an image to be processed into plural small areas;
   a calculating unit which calculates evaluation values of each of said plural small areas based on color information of said image;
   a judging unit which makes a judgment as to whether to use said evaluation values of a small area of attention for white balance calculation based on a relationship between said evaluation values of said small area of attention and said evaluation values of small areas adjacent to said small area of attention among said evaluation values of said plural small areas; and
   a calculating unit which performs white balance calculation based on a judgment result of said judging unit,
   wherein said judging unit makes said judgment based on whether said evaluation values are included in achromatic regions which are defined in advance in a predetermined chromatic coordinate.

2. The white balance adjusting device according to claim 1, wherein said judging unit judges that said evaluation values of said small area of attention should be used for white balance calculation if said evaluation values of said small area of attention are included in said achromatic regions and said evaluation values of all of said small areas adjacent to said small area of attention are included in said achromatic regions.

3. An imaging apparatus comprising said white balance adjusting device according to claim 2.

4. The white balance adjusting device according to claim 1, wherein said judging unit judges that said evaluation values of said small area of attention should be used for white balance calculation if said evaluation values of said small area of attention are included in said achromatic regions and color differences between said small area of attention and all of said small areas adjacent to said small area of attention are smaller than or equal to a predetermined value.

5. The white balance adjusting device according to claim 4, wherein said calculating unit determines a weight to be applied to said evaluation values according to said color differences when they are used for white balance calculation.

6. An imaging apparatus comprising said white balance adjusting device according to claim 5.

7. An imaging apparatus comprising said white balance adjusting device according to claim 4.

8. An imaging apparatus comprising said white balance adjusting device according to claim 1.

9. A non-transitory computer-readable recording medium storing a white balance adjusting program which causes a computer to execute white balance adjustment on image data to be processed, said white balance adjusting program comprising:
   a dividing step dividing an image to be processed into plural small areas;
   a calculating step calculating evaluation values of each of said small areas based on color information of said image;
   a judging step judging whether to use said evaluation values of a small area of attention for white balance calculation based on a relationship between said evaluation values of said small area of attention and said evaluation values of small areas adjacent to said small area of attention among said evaluation values of said plural small areas and whether said evaluation values of said small area of attention are included in achromatic regions which are defined in advance in a predetermined chromatic coordinate; and
   a calculating step performing white balance calculation based on a judgment result of said judging step.

10. A white balance adjusting device comprising:
    a dividing unit which divides an image to be processed into plural small areas;
    a calculating unit which calculates evaluation values of each of said plural small areas based on color information of said image;
    a judging unit which makes a judgment as to whether to use said evaluation values of a small area of attention for white balance calculation based on differences or ratios between said evaluation values of said small area of attention and said evaluation values of small areas adjacent to said small area of attention among said evaluation values of said plural small areas; and
    a calculating unit which performs white balance calculation based on a judgment result of said judging unit;
    wherein said judging unit makes said judgment based on whether said evaluation values are included in achromatic regions which are defined in advance in a predetermined chromatic coordinate.

11. The white balance adjusting device according to claim 10, wherein said judging unit judges that said evaluation values of said small area of attention should be used for white balance calculation if said evaluation values of said small area of attention are included in said achromatic regions and said evaluation values of all of said small areas adjacent to said small area of attention are included in said achromatic regions.

12. An imaging apparatus comprising said white balance adjusting device according to claim 11.

13. The white balance adjusting device according to claim 10, wherein said judging unit judges that said evaluation values of said small area of attention should be used for white balance calculation if said evaluation values of said small area of attention are included in said achromatic regions and color differences between said small area of attention and all of said small areas adjacent to said small area of attention are smaller than or equal to a predetermined value.

14. The white balance adjusting device according to claim 13, wherein said calculating unit determines a weight to be applied to said evaluation values according to said color differences when they are used for white balance calculation.

15. An imaging apparatus comprising said white balance adjusting device according to claim 14.

16. An imaging apparatus comprising said white balance adjusting device according to claim 10.

17. An imaging apparatus comprising said white balance adjusting device according to claim 13.

* * * * *